(12) United States Patent
Huang

(10) Patent No.: US 10,613,661 B2
(45) Date of Patent: Apr. 7, 2020

(54) TOUCH DRIVE UNIT AND DRIVING METHOD THEREOF, TOUCH DRIVE CIRCUIT AND TOUCH DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventor: Fei Huang, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 120 days.

(21) Appl. No.: 15/827,553

(22) Filed: Nov. 30, 2017

(65) Prior Publication Data

US 2018/0275804 A1 Sep. 27, 2018

(30) Foreign Application Priority Data

Mar. 21, 2017 (CN) .......................... 2017 1 0172186

(51) Int. Cl.
G06F 3/041 (2006.01)
G06F 3/044 (2006.01)

(52) U.S. Cl.
CPC ............ *G06F 3/0412* (2013.01); *G06F 3/044* (2013.01); *G06F 3/0418* (2013.01); *G09G 2310/0264* (2013.01)

(58) Field of Classification Search
None
See application file for complete search history.

(56) References Cited

U.S. PATENT DOCUMENTS 8,774,348 B2 * 7/2014 Lin ...................... G09G 3/3677
377/64
2011/0142192 A1 6/2011 Lin et al.
(Continued)

FOREIGN PATENT DOCUMENTS

CN 102024415 A 4/2011
CN 104715734 A 5/2015
(Continued)

OTHER PUBLICATIONS

First Office Action (Taiwan) dated Jun. 12, 2018; Appln. No. 107100771.

*Primary Examiner* — Benjamin C Lee
*Assistant Examiner* — Emily J Frank
(74) *Attorney, Agent, or Firm* — Ladas & Parry LLP

(57) ABSTRACT

A touch drive unit and a driving method thereof, a touch drive circuit and a touch device are disclosed. The touch drive unit includes a shift register sub-unit, a gate sub-unit. The shift register sub-unit includes a shift signal output terminal and is configured to output a shift signal to the gate sub-unit by the shift signal output terminal; the gate sub-unit includes a first input circuit, a first pull-up circuit, a first pull-down control circuit, and a first pull-down circuit; the first pull-up circuit is electrically connected to a touch drive signal terminal, a first pull-up node and a touch signal output terminal, and is configured to output a touch drive signal that is input from the touch drive signal terminal to the touch signal output terminal under a control of an electrical potential of the first pull-up node.

19 Claims, 8 Drawing Sheets

(56) References Cited

U.S. PATENT DOCUMENTS

2014/0355732 A1 12/2014 Lin et al.
2016/0224175 A1* 8/2016 Moon .................. G06F 3/0412
2016/0307641 A1* 10/2016 Zheng ................. G09G 3/3677

FOREIGN PATENT DOCUMENTS

TW 201121241 A 6/2011
TW 201445532 A 12/2014

* cited by examiner

TOUCH DRIVE UNIT AND DRIVING METHOD THEREOF, TOUCH DRIVE CIRCUIT AND TOUCH DEVICE

The present application claims priority to the Chinese patent application No. 201710172186.2, filed on Mar. 21, 2017, the entire disclosure of which is incorporated herein by reference as part of the present application.

TECHNICAL FIELD

Embodiments of the present disclosure relate to a touch drive unit and a driving method thereof, a touch drive circuit and a touch device.

BACKGROUND

With the rapid development of the display technology, touch panels have gradually pervaded throughout people's lives. At present, in-cell touch panels have the advantages such as thin thickness, low cost and so on, and are favored by large panel manufacturers. In the in-cell touch panel technology, mutual capacitive touch panels have the advantages such as high sensitivity, applicability to multi-points touch control, and have become the mainstream in the development trend of the in-cell touch panel technology.

A mutual capacitive touch panel mainly comprises a plurality of touch drive electrodes TX and a plurality of touch sense electrodes RX that are intersected with the touch drive electrodes TX. The touch drive electrodes TX are input with touch drive signals (such as a high frequency alternating signal) line by line, so that sense signals are generated by the touch sense electrodes RX. When a touch activity occurs, the capacitance, between the touch drive electrode TX and the touch sense electrode RX that are at the touch point, is changed accordingly, the sense signal over the sense electrode RX is also changed, and the touch position can be obtained by analyzing the coordinates of the changed sense signal that is output.

SUMMARY

An embodiment of the present disclosure provides a touch drive unit, comprising a shift register sub-unit, a gate sub-unit; the shift register sub-unit comprises a shift signal output terminal and is configured to output a shift signal to the gate sub-unit by the shift signal output terminal; the gate sub-unit comprises a first input circuit, a first pull-up circuit, a first pull-down control circuit, and a first pull-down circuit; the first input circuit is electrically connected to the shift signal output terminal, a touch gate signal terminal, a first pull-up node and the first pull-down control circuit, and is configured to output a signal that is input from the touch gate signal terminal to the first pull-up node and the first pull-down control circuit under a control of the shift signal; the first pull-up circuit is electrically connected to a touch drive signal terminal, the first pull-up node and a touch signal output terminal, and is configured to output a touch drive signal that is input from the touch drive signal terminal to the touch signal output terminal under a control of an electrical potential of the first pull-up node; the first pull-down control circuit is further electrically connected to a first pull-down node, the first voltage terminal and a second voltage terminal, and is configured, under a control of the first input circuit and a first voltage that is input from the first voltage terminal, to output the first voltage and a second voltage that is input from the second voltage terminal to the first pull-down node; and the first pull-down circuit is electrically connected to the first pull-down node, a third voltage terminal and the touch signal output terminal, and is configured to pull down a voltage of the touch signal output terminal to a third voltage that is input from the third voltage terminal under a control of an electrical potential of the first pull-down node.

For example, in the touch drive unit according to an embodiment of the present disclosure, the gate sub-unit comprises a first pull-up control circuit; the first pull-up control circuit is electrically connected to the first voltage terminal, the first input circuit and the first pull-up node, and is configured to transmit a signal that is output from the first input circuit to the first pull-up node under a control of the first voltage.

For example, in the touch drive unit according to an embodiment of the present disclosure, the shift register sub-unit further comprises a second input circuit, a second pull-up control circuit, a second pull-down control circuit, a second pull-up circuit and a second pull-down circuit; the second input circuit is electrically connected to the second pull-up control circuit, the second pull-down control circuit, a shift control signal terminal and a shift signal input terminal, and is configured to output a signal that is input from the shift signal input terminal to the second pull-up control circuit and the second pull-down control circuit under a control of the shift control signal terminal; the second pull-up circuit is further electrically connected to a second pull-up node, the first voltage terminal, the second pull-down circuit and the second pull-down control circuit, and is configured to output the first voltage to the second pull-up node under a control of the second input circuit; the second pull-down control circuit is further electrically connected to a second pull-down node, a first clock signal terminal, a second clock signal terminal, the second voltage terminal and the shift signal output terminal, and is configured, under a control of the second input circuit, a first clock signal that is input from the first clock signal terminal and a second clock signal that is input from the second clock terminal, to output the second clock signal to the second pull-down node, or under a control of the shift signal output terminal, to pull down a voltage of the second pull-down node to the second voltage; the second pull-up circuit is electrically connected to the second pull-up node, the first clock signal terminal and the shift signal output terminal, and is configured to output the first clock signal as the shift signal to shift signal output terminal under a control of an electrical potential of the second pull-up node; and the second pull-down circuit is electrically connected to the second pull-up control circuit, the second pull-down node, the shift signal output terminal and the second voltage terminal, and is configured to respectively pull down the electrical potential of the second pull-up node and the voltage of the shift signal output terminal to the second voltage under a control of the second pull-down node.

For example, in the touch drive unit according to an embodiment of the present disclosure, the first pull-down control circuit comprises a first transistor, a second transistor, a third transistor and a first capacitor; a gate electrode of the first transistor is electrically connected to the first input circuit, a first electrode of the first transistor is electrically connected to a second electrode of the second transistor, and a second electrode of the first transistor is electrically connected to the second voltage terminal; a gate electrode of the second transistor is electrically connected to the first input circuit, and a first electrode of the second transistor is electrically connected to the first pull-down node; a gate electrode and a first electrode of the third transistor are electrically connected to the first voltage terminal, and a second electrode of the third transistor is electrically connected to the first pull-down node; and an end of the first capacitor is electrically connected to the first pull-down node, and other end of the first capacitor is electrically connected to the second voltage terminal.

For example, in the touch drive unit according to an embodiment of the present disclosure, the first input circuit comprises a fourth transistor, a gate electrode of the fourth transistor is electrically connected to the shift signal output terminal, a first electrode of the fourth transistor is electrically connected to the touch gate signal terminal, and a second electrode of the fourth transistor is electrically connected to the first pull-up node.

For example, in the touch drive unit according to an embodiment of the present disclosure, the first pull-up control circuit comprises a fifth transistor, a gate electrode of the fifth transistor is electrically connected to the first voltage terminal, a first electrode of the fifth transistor is electrically connected to the first input circuit, and a second electrode of the fifth transistor is electrically connected to the first pull-up node.

For example, in the touch drive unit according to an embodiment of the present disclosure, the first pull-up circuit comprises a sixth transistor and a second capacitor; a gate electrode of the sixth transistor is electrically connected to the first pull-up node, a first electrode of the sixth transistor is electrically connected to the touch drive signal terminal, and a second electrode of the sixth transistor is electrically connected to the touch signal output terminal; and an end of the second capacitor is electrically connected to the gate electrode of the sixth transistor, and other end of the second capacitor is electrically connected to the second electrode of the sixth transistor.

For example, in the touch drive unit according to an embodiment of the present disclosure, the first pull-down circuit comprises a seventh transistor, a gate electrode of the seventh transistor is electrically connected to the first pull-down node, a first electrode of the seventh transistor is electrically connected to the touch signal output terminal, and a second electrode of the seventh transistor is electrically connected to the third voltage terminal.

For example, in the touch drive unit according to an embodiment of the present disclosure, the second input circuit comprises an eighth transistor, a gate electrode of the eighth transistor is electrically connected to the shift control signal terminal, a first electrode of the eighth transistor is electrically connected to the shift signal input terminal, and a second electrode of the eighth transistor is electrically connected to the first pull-up control circuit and the first pull-down control circuit.

For example, in the touch drive unit according to an embodiment of the present disclosure, the second pull-up control circuit comprises an ninth transistor, a gate electrode of the ninth transistor is electrically connected to the second input circuit, a first electrode of the ninth transistor is electrically connected to the first voltage terminal, and a second electrode of the ninth transistor is electrically connected to the second pull-down circuit.

For example, in the touch drive unit according to an embodiment of the present disclosure, the second pull-up circuit comprises a tenth transistor and a third capacitor; a gate electrode of the tenth transistor is electrically connected to the second pull-up node, a first electrode of the tenth transistor is electrically connected to the first clock signal terminal, and a second electrode of the tenth transistor is electrically connected to the shift signal output terminal; and an end of the third capacitor is electrically connected to the gate electrode of the tenth transistor, and other end of the third capacitor is electrically connected to the second electrode of the tenth transistor.

For example, in the touch drive unit according to an embodiment of the present disclosure, the second pull-down circuit comprises an eleventh transistor, a twelfth transistor, a thirteenth transistor, a fourteenth transistor, a fifteenth transistor, a sixteenth transistor and a fourth capacitor; a gate electrode of the eleventh transistor is electrically connected to the second input circuit, a first electrode of the eleventh transistor is electrically connected to the second pull-down node, and a second electrode of the eleventh transistor is electrically connected to the second voltage terminal; a gate electrode and a first electrode of the twelfth transistor are electrically connected to the first clock signal terminal, and a second electrode of the twelfth transistor is electrically connected to a gate electrode of the fourteenth transistor; a gate electrode of the thirteenth transistor is electrically connected to the second input circuit, a first electrode of the thirteenth transistor is electrically connected to the gate electrode of the fourteenth transistor, and a second electrode of the thirteenth transistor is electrically connected to the second voltage terminal; a first electrode of the fourteenth transistor is electrically connected to the second clock signal terminal, and a second electrode of the fourteenth transistor is electrically connected to a first electrode of the fifteenth transistor; a gate electrode of the fifteenth transistor is electrically connected to the second clock signal terminal, and a second electrode of the fifteenth transistor is electrically connected to the second pull-down node; a gate electrode of the sixteenth transistor is electrically connected to the shift signal output terminal, a first electrode of the sixteenth transistor is electrically connected to the second pull-down node, and a second electrode is electrically connected to the second voltage terminal; and an end of the fourth capacitor is electrically connected to the gate electrode of the fourteenth transistor, and other end of the fourth capacitor is electrically connected to the second voltage terminal.

For example, in the touch drive unit according to an embodiment of the present disclosure, the second pull-down circuit comprises a seventeenth transistor, a eighteenth transistor and a fifth capacitor; a gate electrode of the seventeenth transistor is electrically connected to the second pull-down node, a first electrode of the seventeenth transistor is electrically connected to the second pull-up control circuit, and a second electrode of the seventeenth transistor is electrically connected to the second voltage terminal; a gate electrode of the eighteenth transistor is electrically connected to the second pull-down node, a first electrode of the eighteenth transistor is electrically connected to the shift signal output terminal, and a second electrode of the eighteenth transistor is electrically connected to the second voltage terminal; and an end of the fifth capacitor is electrically connected to the second pull-down node, and other end of the fifth capacitor is electrically connected to the second voltage terminal.

For example, in the touch drive unit according to an embodiment of the present disclosure, the second pull-up control circuit further comprises an nineteenth transistor, a gate electrode of the nineteenth transistor is electrically connected to the first voltage terminal, a first electrode of the nineteenth transistor is electrically connected to the second electrode of the ninth transistor, and a second electrode of the nineteenth transistor is electrically connected to the second pull-up node.

For example, in the touch drive unit according to an embodiment of the present disclosure, the first pull-down control circuit comprises a twentieth transistor and a twenty-first transistor; a gate electrode of the twentieth transistor is electrically connected to the first voltage terminal, a first electrode of the twentieth transistor is electrically connected to the first input circuit, and a second electrode of the twentieth transistor is electrically connected to the gate electrode of the second transistor; and a gate electrode of the twenty-first transistor is electrically connected to the first voltage terminal, a first electrode of the twenty-first transistor is electrically connected to the first electrode of the second transistor, and a second electrode of the twenty-first transistor is electrically connected to the first pull-down node.

For example, in the touch drive unit according to an embodiment of the present disclosure, the gate sub-unit further comprises a reset circuit; the reset circuit is electrically connected to a reset terminal, the first pull-up node and the second voltage terminal, and is configured to output the second voltage to the first pull-up node under a control of a reset signal that is input from the reset terminal.

For example, in the touch drive unit according to an embodiment of the present disclosure, the reset circuit comprises a twenty-second transistor, a gate electrode of the twenty-second transistor is electrically connected to the reset terminal, a first electrode of the twenty-second transistor is electrically connected to the first pull-up node, and a second electrode is electrically connected to the second voltage terminal.

Another embodiment of the present disclosure provides a touch drive circuit, comprising a plurality of cascaded touch drive units according to any one of the above-mentioned embodiments, except for a first level touch drive unit, a shift signal output terminal of a preceding-level touch drive unit is electrically connected to a shift signal input terminal of a following-level touch drive unit.

Further another embodiment of the present disclosure provides a touch device, comprising the touch drive circuit according to the above-mentioned embodiment.

Still further another embodiment of the present disclosure provides a driving method of the touch drive unit according to the above-mentioned embodiment, comprising: a first stage in which under the control of the shift signal, the signal that is input from the touch gate signal terminal is transmitted to the first pull-up node through the first input circuit to charge the first pull-up node; under the control of an electrical potential of the first pull-up node, the first pull-up circuit transmits the touch drive signal to the touch signal output terminal; the first pull-down control circuit outputs the second voltage to the first pull-down node to pull down the first pull-down node; and a second stage in which under the control of the shift signal, the first pull-up node discharges through the first input circuit to pull down the first pull-up node; the first pull-down control circuit outputs the first voltage to the first pull-down node to charge the first pull-down node; and under the control of the electrical potential of the first pull-down node, the voltage of the touch signal output terminal is pulled down to the third voltage to reset the touch signal output terminal.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE CHARACTERS

01—shift register sub-unit; 02—gate sub-unit; 11—first input circuit; 21—first pull-up control circuit; 31—first pull-up circuit; 41—first pull-down control circuit; 51—first pull-down circuit; 61—reset circuit; 10—second input circuit; 20—second pull-up control circuit; 30—second pull-up circuit; 40—second pull-down control circuit; 50—second pull-down circuit.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Figure 1:
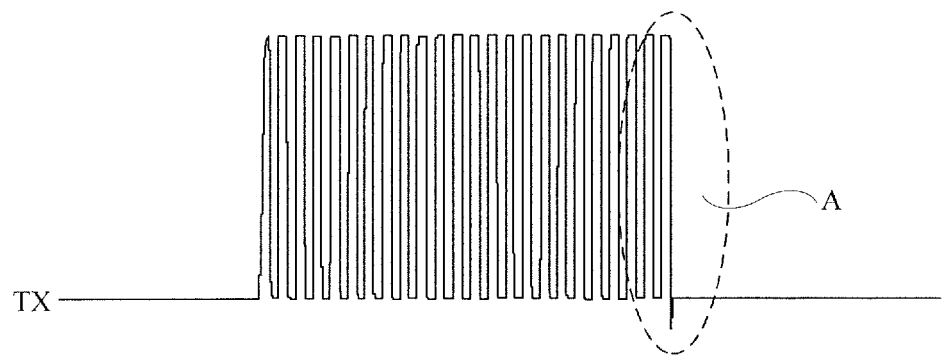
FIG. 1 is a waveform of a touch drive signal that is output from a touch drive unit.

A mutual capacitive touch panel can use a driving chip to input a touch drive signal to each touch drive electrode TX. In order to achieve a narrow bezel design, a touch drive circuit that is integrated on the display panel can be used, the touch drive circuit is used to output touch drive signals to the touch drive electrodes TX line by line. A touch drive signal that is output from a touch drive circuit is illustrated in FIG. 1, and noise occurs at the position A of the signal waveform, which lowered the transmission quality of the signal.

Figure 2:
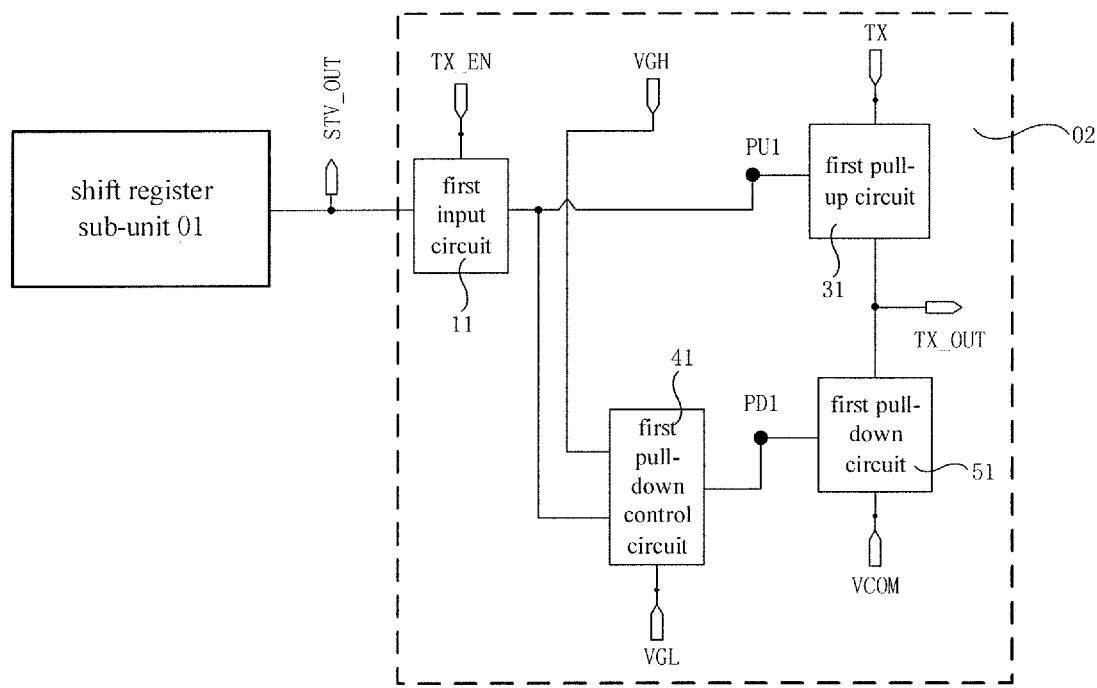
FIG. 2 is a structural schematic diagram of the touch drive unit in an embodiment of the present disclosure.

An embodiment of the present disclosure provides a touch drive unit (or referred to as touch drive circuit unit), as illustrated in FIG. 2, and the touch drive unit comprises a shift register sub-unit (or referred to as shift register circuit sub-unit) 01 and a gate sub-unit (or referred to as gate circuit sub-unit) 02 that are coupled to each other, for example, electrically connected with each other. For example, the shift register sub-unit 01 comprises a shift signal output terminal STV_OUT and is configured to output a shift signal to the gate sub-unit 02 from the shift signal output terminal STV_OUT. For example, the gate sub-unit 02 comprises a first input circuit 11, a first pull-up circuit 31, a first pull-down control circuit 41, and a first pull-down circuit 51.

Figure 3:
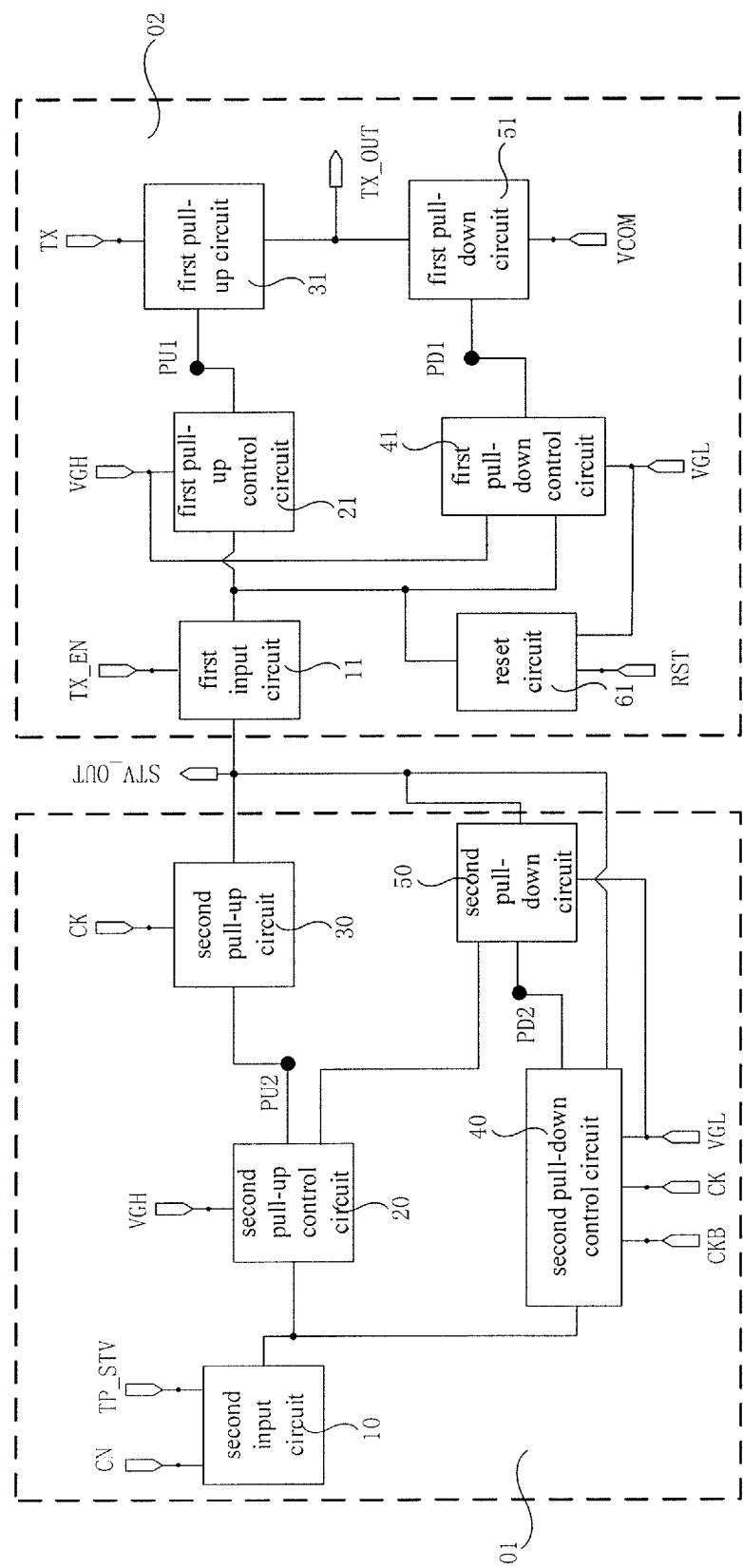
FIG. 3 is a structural schematic diagram of another touch drive unit in an embodiment of the present disclosure.

The first input circuit 11 is electrically connected to the shift signal output terminal STV_OUT, a touch gate signal terminal TX_EN, a first pull-up node PU1 and the first pull-down control circuit, 41. It should be noted that the first input circuit 11 can be directly connected to the first pull-up node PU1 (as illustrated in FIG. 2), and alternatively the first input circuit 11 can also be connected to the first pull-up node PU1 through other circuit (such as a first pull-up control circuit that is illustrated in FIG. 3). The embodiments of the present disclosure are not limited in this aspect.

For example, the first input circuit 11 can be configured to output a signal that is input from the touch gate signal terminal TX_EN to the first pull-up node PU1 and the first pull-down control circuit 41 under a control of the shift signal that is output from the shift signal output terminal STV_OUT. It should be noted that when the gate sub-unit 02 comprises a first pull-up control circuit 21, the signal that is input from the touch gate signal terminal TX_EN can be transmit through the first pull-up control circuit 21 to the first pull-up node PU1.

The first pull-up circuit 31 is electrically connected to a touch drive signal terminal TX, the first pull-up node PU1 and a touch signal output terminal TX_OUT. For example, the first pull-up circuit 31 can be configured to output a touch drive signal that is input from the touch drive signal terminal TX to the touch signal output terminal TX_OUT under a control of the electrical potential of the first pull-up node PU1_. The touch signal output terminal TX_OUT outputs the touch drive signal to a touch drive electrode for realizing touch scan.

The first pull-down control circuit 41 is also electrically connected to a first pull-down node PD1, a first voltage terminal VGH and a second voltage terminal VGL. For example, the first pull-down control circuit 41 can be configured, under a control of the first input circuit 11 and a first voltage that is input from the first voltage terminal VGH, to output the first voltage or a second voltage that is input from the second voltage terminal VGL to the first pull-down node PD1.

The first pull-down circuit 51 is electrically connected to the first pull-down node PD1, a third voltage terminal VCOM and the touch signal output terminal TX_OUT. For example, the first pull-down circuit 51 can be configured to pull down the voltage of the touch signal output terminal TX_OUT to a third voltage that is input from the third voltage terminal VCOM under a control of the electrical potential of the first pull-down node PD1.

It should be noted that at least one embodiment of the present disclosure takes the first voltage that is input from the first voltage terminal VGH being the high potential, the second voltage that is input from the second voltage terminal VGL being the low potential and the third voltage that is input from the third voltage terminal VCOM being the low potential for an example to illustrate. In at least one example, the second voltage that is input from the second voltage terminal VGL and the third voltage that is input from the third voltage terminal VCOM can be different from each other. The following embodiments are the same as this example, and this arrangement are not described again.

For example, as illustrated in FIG. 3, in another example, the gate sub-unit 02 can further comprise a first pull-up control circuit 21.

The first pull-up control circuit 21 is electrically connected to the first voltage terminal VGH, the first input circuit 11 and the first pull-up node PU1. For example, the first pull-up control circuit 21 can be configured to transmit a signal that is output from the first input circuit 11 to the first pull-up node PU1 under a control of the first voltage that is input from the first voltage terminal VGH.

Compared with the example that is illustrated in FIG. 2, in the touch drive unit of the example that is illustrated in FIG. 3, the signal that is output from the first input circuit 11 is transmitted through the first pull-up control circuit 21 to the first pull-up node PU1, and the first pull-up control circuit 21 can filter and reduce noise.

It can be seen from the above, the gate sub-unit 02 can employ the first pull-up control circuit 21 to transmit the signal that is input from the first input circuit 11, namely the signal that is input from the touch gate signal terminal TX_EN, to the first pull-up node PU1 to charge the first pull-up node PU1. At this moment, the first pull-up circuit 31 can output the signal that is input from the touch drive signal terminal TX to the touch signal output terminal TX_OUT under the control of the first pull-up node PU1, and therefore output the touch drive signal to the touch drive electrode that is connected to the touch signal output terminal TX_OUT.

The gate sub-unit 02 can gate the touch drive signal according to requirement, namely the gate sub-unit 02 can output the touch drive signal that is input from the touch drive signal terminal TX via the touch signal output terminal TX_OUT, under the control of the touch gate signal terminal TX_EN, to drive the touch drive electrode arranged in a touch area. Based on the above, in order to reduce the noise of the signal that is output from the touch signal output terminal TX_OUT, the electrical potential of the first pull-down node PD1 can be pulled down by the first pull-down control circuit 41 to the second voltage (such as a low potential) that is input from the second voltage terminal VGL, so as to prevent the signal that is output from the touch signal output terminal TX_OUT from being affected by the interference from the third voltage terminal VCOM resulted from the mistakenly raised electrical potential of the first pull-down node PD1.

In addition, when the touch signal output terminal TX_OUT needs not to output the touch drive signal, the first pull-down control circuit 41 can output the first voltage that is input from the first voltage terminal VGH to the first pull-down node PD1 to pull down the electrical potential of the touch signal output terminal TX_OUT to the third voltage terminal VCOM through the first pull-down circuit 51 under the control of the electrical potential of the first pull-down node PD1.

For example, as illustrated in FIG. 3, in an example, the shift register sub-unit 01 can further comprise a second input circuit 10, a second pull-up control circuit 20, a second pull-up circuit 30, a second pull-down control circuit 40 and a second pull-down circuit 50, in addition to the shift signal output terminal STV_OUT.

The second input circuit 10 is electrically connected to the second pull-up control circuit 20, the second pull-down control circuit 40, a shift control signal terminal CN and a shift signal input terminal TP_STV. For example, under a control of the shift control signal terminal CN, the second input circuit 10 can be configured to output a signal that is input from the shift signal input terminal TP_STV to the second pull-up control circuit 20 and the second pull-down control circuit 40.

The second pull-up circuit 20 is also electrically connected to a second pull-up node PU2, the first voltage terminal VGH, the second pull-down circuit 50 and the second pull-down control circuit 40. For example, the second pull-up circuit 20 can be configured to output the first voltage that is input from the first voltage terminal VGH to the second pull-up node PU2 under a control of the second input circuit 10.

The second pull-down control circuit 40 is also electrically connected to a second pull-down node PD2, a first clock signal terminal CK, a second clock signal terminal CKB, the second voltage terminal VGL and the shift signal output terminal STV_OUT. For example, the second pull-down control circuit 40 can be configured, under a control of the second input circuit 10, a first clock signal that is input from the first clock signal terminal CK and a second clock signal that is input from the second clock terminal CKB, to output the second clock signal to the second pull-down node PD2. Alternatively, the second pull-down control circuit 40 can also be configured to pull down the voltage of the second pull-down node PD2 to the second voltage that is input from the second voltage terminal VGL under a control of the shift signal output terminal STV_OUT.

The second pull-up circuit 30 is electrically connected to the second pull-up node PU2, the first clock signal terminal CK and the shift signal output terminal STV_OUT. For example, the second pull-up circuit 30 can be configured to output the first clock signal as the shift signal to shift signal output terminal STV_OUT under a control of an electrical potential of the second pull-up node PU2.

The second pull-down circuit 50 is electrically connected to the second pull-up control circuit 20, the second pull-down node PD2, the shift signal output terminal STV_OUT and the second voltage terminal VGL. For example, the second pull-down circuit 50 can be configured under a control of the second pull-down node PD2 to respectively pull down the electrical potential of the second pull-up node PU2 and the voltage of the shift signal output terminal STV_OUT to the second voltage (such as a low potential) that is input from the second voltage terminal VGL.

It is known from the above mentions, the shift register sub-unit 01 can use the second pull-up control circuit 20 to charge the second pull-up node PU2 under the control of the shift control signal terminal CN, so that the first clock signal that is input from the first clock signal terminal CK can be output as the shift signal to the shift signal output terminal STV_OUT under the control of the electrical potential of the second pull-up node PU2, enabling the shift register sub-unit 01 to possess the function of signal shift register. Therefore, a touch drive circuit that comprises a plurality of cascaded touch drive units can allow the gate sub-unit 02 of each touch drive unit to receive the signal that is output from the shift register sub-unit 01 to which the gate sub-unit 02 is connected, and then output the touch drive signals one by one so that the touch drive circuit can drive touch drive electrodes line by line.

At the same time, in order to reduce the noise of the shift signal that is output from the shift signal output terminal STV_OUT, the second pull-down control circuit 40 can pull down the electrical potential of the second pull-down node PD2 to the second voltage (such as a low potential) that is input from the second voltage terminal VGL to prevent the second pull-down circuit 50 from pulling down the electrical potential of the shift signal output terminal STV_OUT. When the shift signal output terminal STV_OUT needs not to output the shift signal, the second pull-down control circuit 40 outputs the second clock signal that is input from the second clock signal terminal CKB to the second pull-down node PD2 so as to pull down the voltage of the shift signal output terminal STV_OUT by the second pull-down circuit 50 under the control of the electrical potential of the second pull-down node PD2.

A specific structure of each circuit in the touch drive unit that is illustrated in FIG. 3 is taken as an example to illustrate in detail.

Figure 4:
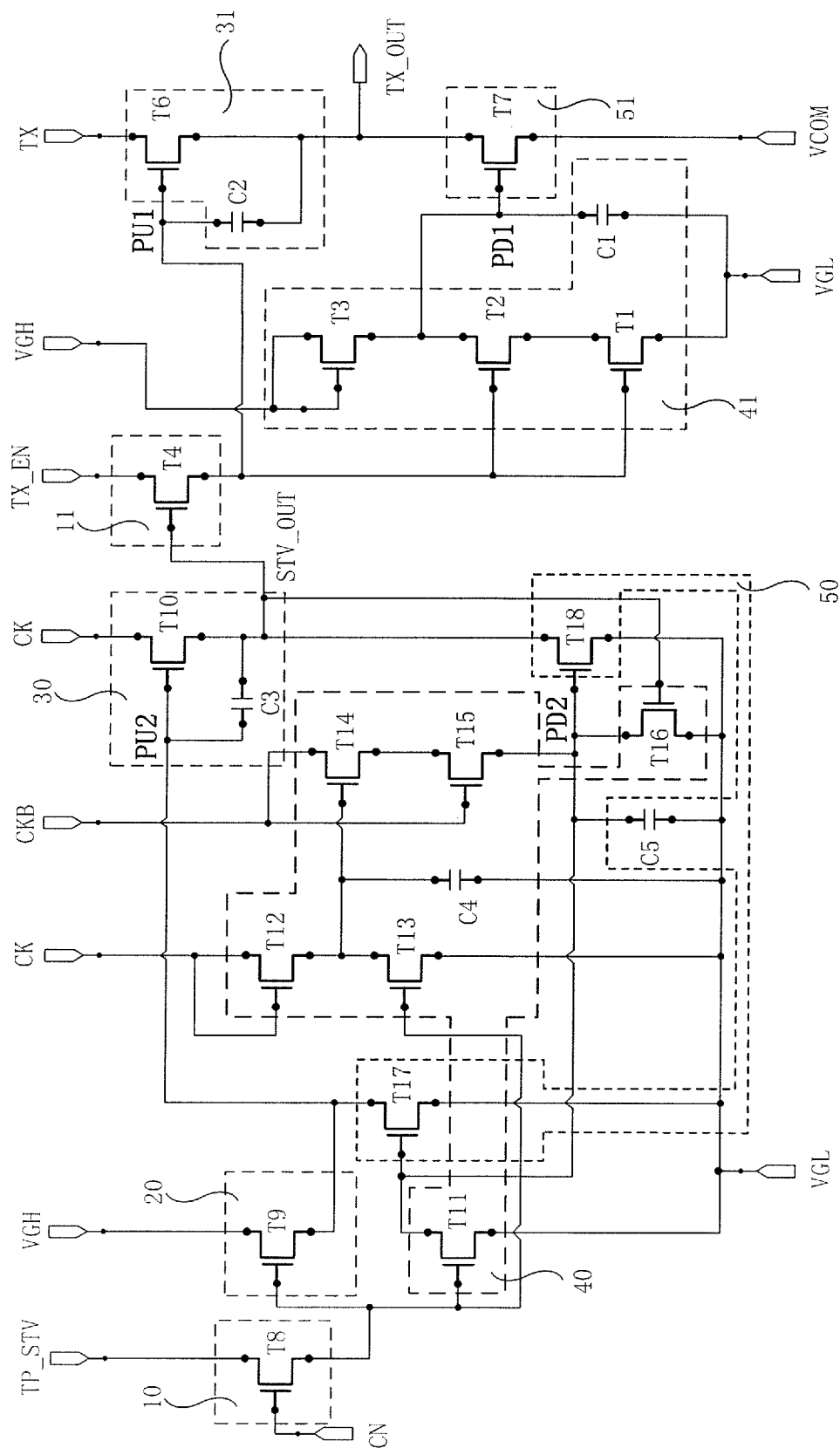
FIG. 4 is a specific structural schematic diagram of each circuit in FIG. 2.

For example, in an example, as illustrated in FIG. 4, the first pull-down control circuit 41 can comprise a first transistor T1, a second transistor T2, a third transistor T3 and a first capacitor C1.

A gate electrode of the first transistor T1 is electrically connected to the first input circuit 11, a first electrode of the first transistor T1 is electrically connected to a second electrode of the second transistor T2, and a second electrode of the first transistor T1 is electrically connected to the second voltage terminal VGL.

A gate electrode of the second transistor T2 is electrically connected to the first input circuit 11, and a first electrode of the second transistor T2 is electrically connected to the first pull-down node PD1.

A gate electrode and a first electrode of the third transistor T3 are electrically connected to the first voltage terminal VGH, and a second electrode of the third transistor T3 is electrically connected to the first pull-down node PD1. The third transistor T3 works in diode connection state, thus possessing the property of unidirectional conduction, and the first voltage that is input from the first voltage terminal VGH can be transmitted to the first pull-down node PD1 to charge the first pull-down node PD1 under the conduction of the third transistor T3.

An end of the first capacitor C1 is electrically connected to the first pull-down node PD1, the other end of the first capacitor C1 is electrically connected to the second voltage terminal VGL. The first capacitor C1 can have the function of filtering and stabilizing signal.

In the above mentioned example, the first transistor T1 and the second transistor T2 that are connected in series constitute an inverter, so that the signal that is input to the gate electrode of the first transistor T1 and the second transistor T2 and the electrical potential (namely the electrical potential of the first pull-down node PD1) of the first electrode of the second transistor T2 are one of a high potential and a low potential and the other respectively. Taking the first transistor T1 and the second transistor T2 being N-type transistors as an example, when the first transistor T1 and the second transistor T2 are switched on, the first transistor T1 and the second transistor T2 can pull down the electrical potential of the first pull-down node PD1 to the second voltage terminal VGL. Besides, when the touch signal output terminal TX_OUT outputs the touch drive signal, the first transistor T1 and the second transistor T2 that are connected in series can increase the voltage division thereof, and allow the first pull-down control circuit 41 to better control the electrical potential of the first pull-down node PD1.

For example, when designing the transistors, the first transistor T1, the second transistor T2 and the third transistor T3 can be configured (such as the size, threshold voltage and so on are configured) to pull down the electrical potential of the first pull-down node PD1 to be or close to the low potential that is input from the second voltage terminal VGL resulting from the voltage division of the first transistor T1 and the second transistor T2 when the transistor T1, T2 and T3 are all switched on.

Figure 5:
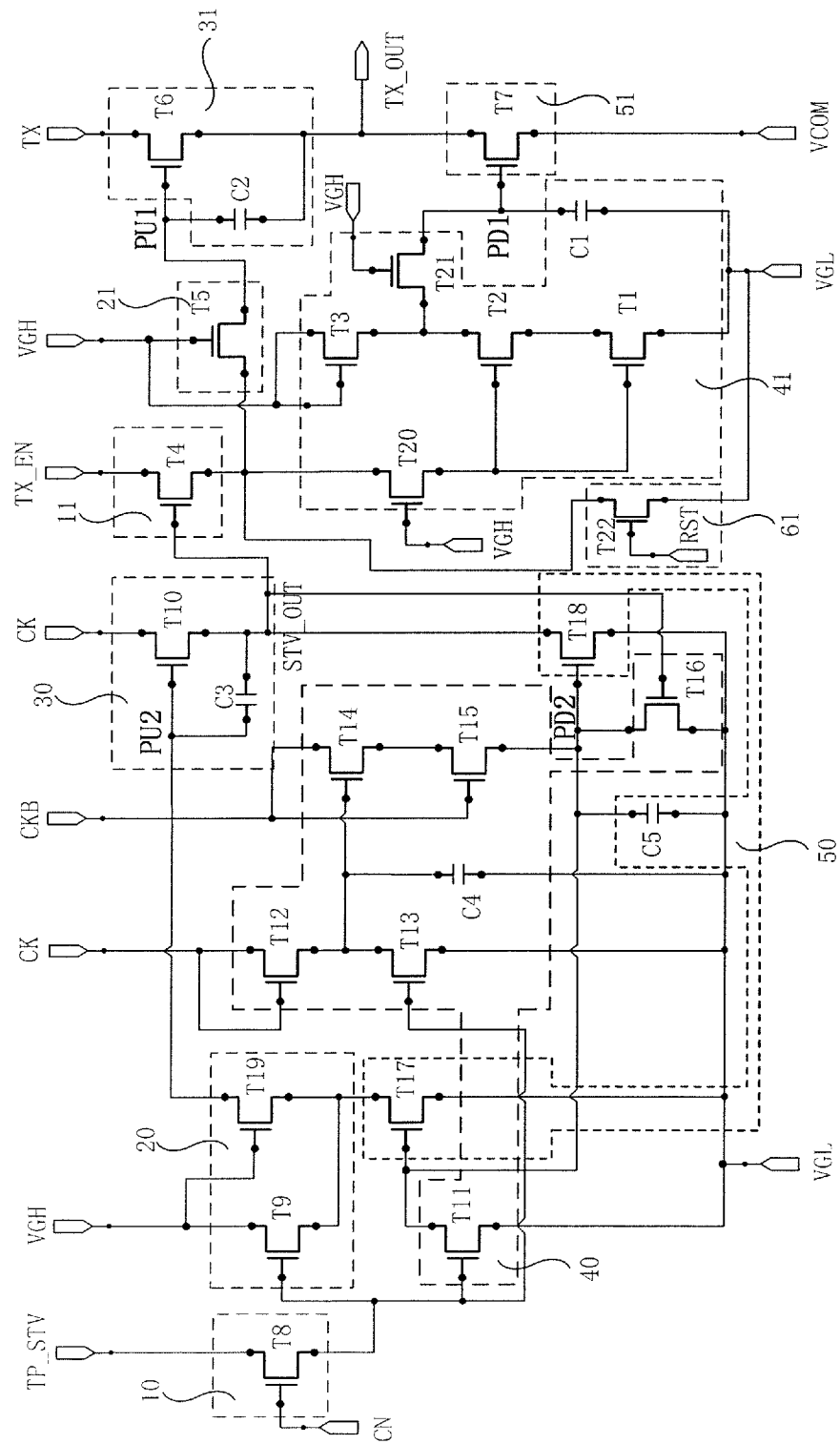
FIG. 5 is a specific structural schematic diagram of each circuit in FIG. 3.

Based on the above mentioned examples, in order to increase the filtering effect, in another example, as illustrated in FIG. 5, the first pull-down control circuit 41 can further comprise a twentieth transistor T20 and a twenty-first transistor T21.

A gate electrode of the twentieth transistor T20 is electrically connected to the first voltage terminal VGH, a first electrode of the twentieth transistor T20 is electrically connected to the first input circuit 11, and a second electrode of the twentieth transistor T20 is electrically connected to the gate electrode of the first transistor T1 and the second transistor T2.

A gate electrode of the twenty-first transistor T21 is electrically connected to the first voltage terminal VGH, a first electrode of the twenty-first transistor T21 is electrically connected to the first electrode of the second transistor T2, and a second electrode of the twenty-first transistor T21 is electrically connected to the first pull-down node PD1.

Because the gate electrodes of the twentieth transistor T20 and the twenty-first transistor T21 are both connected to the first voltage terminal VGH, when the twentieth transistor T20 and the twenty-first transistor T21 are both N-type transistors, the two transistors are maintained at ON-state, that is, continuously switched on. The transistor itself has certain capacitance, and therefore the twentieth transistor T20 and the twenty-first transistor T21 can have the effect of filtering and stabilizing the signal that is transmitted through the two transistors.

For example, as illustrated in FIG. 4 and FIG. 5, the first input circuit 11 comprises a fourth transistor T4. A gate electrode of the fourth transistor T4 is electrically connected to the shift signal output terminal STV_OUT, a first electrode of the fourth transistor T4 is electrically connected to the touch gate signal terminal TX_EN, a second electrode of the fourth transistor T4 is electrically connected to the first pull-up node PU1. For example, as illustrated in FIG. 4, the second electrode of the fourth transistor T4 can be directly connected to the first pull-up node PU1. For example, as illustrated in FIG. 5, when the gate sub-unit 02 comprises the first pull-up control circuit 21, the second electrode of the fourth transistor T4 can be connected to the first pull-up node PU1 through the first pull-up control circuit 21.

For example, as illustrated in FIG. 5, the first pull-up control circuit 21 comprises a fifth transistor T5. A gate electrode of the fifth transistor T5 is electrically connected to the first voltage terminal VGH, a first electrode of the fifth transistor T5 is electrically connected to the first input circuit 11, and a second electrode of the fifth transistor T5 is electrically connected to the first pull-up node PU1. When the structure of the first input circuit 11 is as the above mentioned, the first electrode of the fifth transistor T5 is electrically connected to the second electrode of the fourth transistor T4.

For example, as illustrated in FIG. 4 and FIG. 5, the first pull-up circuit 31 comprises a sixth transistor T6 and a second capacitor C2. A gate electrode of the sixth transistor T6 is electrically connected to the first pull-up node PU1, a first electrode of the sixth transistor T6 is electrically connected to the touch drive signal terminal TX, and a second electrode of the sixth transistor T6 is electrically connected to the touch signal output terminal TX_OUT.

An end of the second capacitor C2 is electrically connected to the gate electrode of the sixth transistor T6, the other end of the second capacitor C2 is electrically connected to the second electrode of the sixth transistor T6. The second capacitor C2 can have the function of filtering and stabilizing signal.

It should be noted that the touch signal output terminal TX_OUT of the gate sub-unit 02 is connected with the touch drive electrode, and therefore the load of the sixth transistor T6 becomes bigger, and the sixth transistor T6 needs the capacity of driving to some degree. In at least one example, the size of the sixth transistor T6 can be larger than that of other transistors (e.g., a seventh transistor T7 and so on) of the gate sub-unit 02.

For example, as illustrated in FIG. 4 and FIG. 5, the first pull-down circuit 51 comprises the seventh transistor T7. A gate electrode of the seventh transistor T7 is electrically connected to the first pull-down node PU1, a first electrode of the seventh transistor T7 is electrically connected to the touch signal output terminal TX_OUT, and a second electrode of the seventh transistor T7 is electrically connected to the third voltage terminal VCOM.

For example, as illustrated in FIG. 4 and FIG. 5, the second input circuit comprises an eighth transistor T8, a gate electrode of the eighth transistor T8 is electrically connected to the shift control signal terminal CN, a first electrode of the eighth transistor T8 is electrically connected to the shift signal input terminal TP_STV, and a second electrode of the eighth transistor T8 is electrically connected to the first pull-up control circuit 20 and the first pull-down control circuit 40.

For example, as illustrated in FIG. 4, the second pull-up control circuit 20 comprises an ninth transistor T9, a gate electrode of the ninth transistor T9 is electrically connected to the second input circuit 10, a first electrode of the ninth transistor T9 is electrically connected to the first voltage terminal VGH, and a second electrode of the ninth transistor T9 is electrically connected to the second pull-up node PU2. When the structure of the second input circuit 10 is as the above mentioned, the gate electrode of the ninth transistor T9 is electrically connected to the second electrode of the eighth transistor T8.

Based on the above example, in order to improve the filtering effect, in another example, as illustrated in FIG. 5, the second pull-up control circuit 20 can further comprise an nineteenth transistor T19, a gate electrode of the nineteenth transistor T19 is electrically connected to the first voltage terminal VGH, a first electrode of the nineteenth transistor T19 is electrically connected to the second electrode of the ninth transistor T9, and a second electrode of the nineteenth transistor T19 is electrically connected to the second pull-up node PU2. For example, when the nineteenth transistor T19 is an N-type transistor, the nineteenth transistor T19 is maintained in the ON-state. The transistor itself has certain capacitance, and therefore can have an effect of filtering the signal that is transmitted through the transistor.

For example, as illustrated in FIG. 4 and FIG. 5, the second pull-up circuit 30 comprises a tenth transistor T10 and a third capacitor C3. A gate electrode of the tenth transistor T10 is electrically connected to the second pull-up node PU2, a first electrode of the tenth transistor T10 is electrically connected to the first clock signal terminal CK, and a second electrode of the tenth transistor T10 is electrically connected to the shift signal output terminal STV_OUT.

An end of the third capacitor C3 is electrically connected to the gate electrode of the tenth transistor T10, and the other end of the third capacitor C3 is electrically connected to the second electrode of the tenth transistor T10.

It should be noted that the second electrode of the tenth transistor T10 is connected with the gate sub-unit 02 through the shift signal output terminal STV_OUT, the gate sub-unit 02 comprises a plurality of transistors and the touch drive electrode is connected with the touch signal output terminal TX_OUT of the gate sub-unit 02, and therefore the load of the tenth transistor T10 is big, and the tenth transistor T10 needs capacity of driving to some degree. In at least one example, the size of the tenth transistor T10 can be larger than that of other transistors of the shift register sub-unit 01. Besides, the third capacitor C3 that is connected with the tenth transistor T10 can have a certain function of voltage bootstrap, and therefore can further raise the gate electrode potential of the tenth transistor T10 and enabling the tenth transistor T10 to be maintained at a stable ON-state.

For example, as illustrated in FIG. 4 and FIG. 5, the second pull-down circuit 40 comprises an eleventh transistor T11, a twelfth transistor T12, a thirteenth transistor T13, a fourteenth transistor T14, a fifteenth transistor T15, a sixteenth transistor T16 and a fourth capacitor C4.

A gate electrode of the eleventh transistor T11 is electrically connected to the second input circuit 10, a first electrode of the eleventh transistor T11 is electrically connected to the second pull-down node PD2, and a second electrode of the eleventh transistor T11 is electrically connected to the second voltage terminal VGL. When the structure of the second input circuit 10 is as the above mentioned, the gate electrode of the eleventh transistor T11 is electrically connected to the second electrode of the eighth transistor T8.

A gate electrode and a first electrode of the twelfth transistor T12 are electrically connected to the first clock signal terminal CK, and a second electrode of the twelfth transistor T12 is electrically connected to the gate electrode of the fourteenth transistor T14. At this moment, the twelfth transistor T12 works in diode connection state, thus possessing the property of unidirectional conduction, and therefore the first clock signal that is input from the first clock signal terminal CK can be transmitted to the gate electrode of the fourteenth transistor T14 to ensure the stable transmission of the signal by way of the conduction of the twelfth transistor T12.

A gate electrode of the thirteenth transistor T13 is electrically connected to the second input circuit 11, a first electrode of the thirteenth transistor T13 is electrically connected to the gate electrode of the fourteenth transistor T14, and a second electrode of the thirteenth transistor T13 is electrically connected to the second voltage terminal VGL. When the structure of the second input circuit 10 is as the above mentioned, the gate electrode of the thirteenth transistor T13 is electrically connected to the second electrode of the eighth transistor T8.

A first electrode of the fourteenth transistor T14 is electrically connected to the second clock signal terminal CKB, and a second electrode of the fourteenth transistor T14 is electrically connected to a first electrode of the fifteenth transistor T15.

A gate electrode of the fifteenth transistor T15 is electrically connected to the second clock signal terminal CKB, and a second electrode of the fifteenth transistor T15 is electrically connected to the second pull-down node PD2.

A gate electrode of the sixteenth transistor T16 is electrically connected to the shift signal output terminal STV_OUT, a first electrode of the sixteenth transistor T16 is electrically connected to the second pull-down node PD2, and a second electrode of the sixteenth transistor T16 is electrically connected to the second voltage terminal VGL.

An end of the fourth capacitor C4 is electrically connected to the gate electrode of the fourteenth transistor T14, and the other end of the fourth capacitor C4 is electrically connected to the second voltage terminal VGL. The fourth capacitor C4 can filter and stabilize signal.

For example, as illustrated in FIG. 4 and FIG. 5, the second pull-down circuit 50 comprises a seventeenth transistor T17, a eighteenth transistor T18 and a fifth capacitor C5.

For example, in an example, as illustrated in FIG. 4, a gate electrode of the seventeenth transistor T17 is electrically connected to the second pull-down node PD2, a first electrode of the seventeenth transistor T17 is electrically connected to the second pull-up node PU2, and a second electrode of the seventeenth transistor T17 is electrically connected to the second voltage terminal VGL.

For example, in another example, as illustrated in FIG. 5, when the first pull-up control circuit 20 comprises the nineteenth transistor T19, the gate electrode of the seventeenth transistor T17 is electrically connected to the second pull-down node PD2, the first electrode of the seventeenth transistor T17 is electrically connected to the first electrode of the nineteenth transistor T19, and the second electrode of the seventeenth transistor T17 is electrically connected to the second voltage terminal VGL.

A gate electrode of the eighteenth transistor T18 is electrically connected to the second pull-down node PD2, a first electrode of the eighteenth transistor T18 is electrically connected to the shift signal output terminal STV_OUT, and a second electrode of the eighteenth transistor T18 is electrically connected to the second voltage terminal VGL.

An end of the fifth capacitor C5 is electrically connected to the second pull-down node PD2, and the other end of the fifth capacitor C5 is electrically connected to the second voltage terminal VGL. The fifth capacitor C5 can filter and stabilize signal.

For example, as illustrated in FIG. 3, in another example, the gate sub-unit 02 further comprises a reset circuit 61. The reset circuit 61 is electrically connected to a reset terminal RST, the first pull-up node PU1 and the second voltage terminal VGL. For example, when the gate sub-unit 02 comprises the first pull-up control circuit 21, the reset circuit 61 can be connected to the first pull-up node PU1 through the first pull-up control circuit 21. Certainly, the reset circuit 61 can also be directly connected to the first pull-up node PU1, and the embodiments of the present disclosure are not limited in this aspect.

For example, under a control of a reset signal that is input from the reset terminal RST, the reset circuit 61 can be configured to output the second voltage (such as a low potential) that is input from the second voltage terminal VGL to the first pull-up node PU1 to reset the first pull-up node PU1. The reset circuit 61 is arranged to better reset the first pull-up node PU1.

For example, as illustrated in FIG. 5, the reset circuit 61 can comprise a twenty-second transistor T22. A gate electrode of the twenty-second transistor T22 is electrically connected to the reset terminal RST to receive the reset signal, a first electrode of the twenty-second transistor T22 is electrically connected to the first pull-up node PU1, and a second electrode is electrically connected to the second voltage terminal VGL. For example, when the first pull-up control circuit 21 comprises the fifth transistor T5, the first electrode of the twenty-second transistor T22 is electrically connected to the first electrode of the fifth transistor T5.

It should be noted that in the embodiment of the present disclosure, the implementation of the shift register sub-unit 01 is not limited to the circuit structures that are illustrated in FIG. 4 and FIG. 5, the shift register sub-unit 01 can also use any existing circuit, as long as the shift signal output terminal STV_OUT of the shift register sub-unit 01 can output the shift signal to the gate sub-unit 02.

It should be noted that the above mentioned transistors can be all N-type transistors or P-type transistors in the embodiments of the present disclosure. The embodiments of the present disclosure are not limited in this aspect. Taking the above mentioned transistors being all N-type transistors for an example, the above mentioned transistors can constitute an NMOS touch drive unit. The NMOS touch drive unit has a single transmission gate, such as the seventh transistor T7. In comparison, the transmission gate of a CMOS (Complementary Metal Oxide Semiconductor) touch drive unit comprises an N-type transistor and a P-type transistor. Therefore, compared with the CMOS touch drive unit, the NMOS touch drive units that are illustrated in FIG. 4 and FIG. 5 can be used to reduce the amount of the transistors, making the power consumption lower. Besides, in at least one exemplary application, when the gate lines of the display panel that comprises the above mentioned touch drive unit are driven by an NMOS Display GOA (Gate Driver on Array), the NMOS touch drive unit can match the NMOS Display GOA better, which reduces the manufacturing cost.

In the description of the present disclosure, according to the specific situation, the first electrode of the above mentioned transistor is a drain electrode and the second electrode is a source electrode, or the first electrode is a source electrode and the second electrode is a drain electrode.

Figure 8:
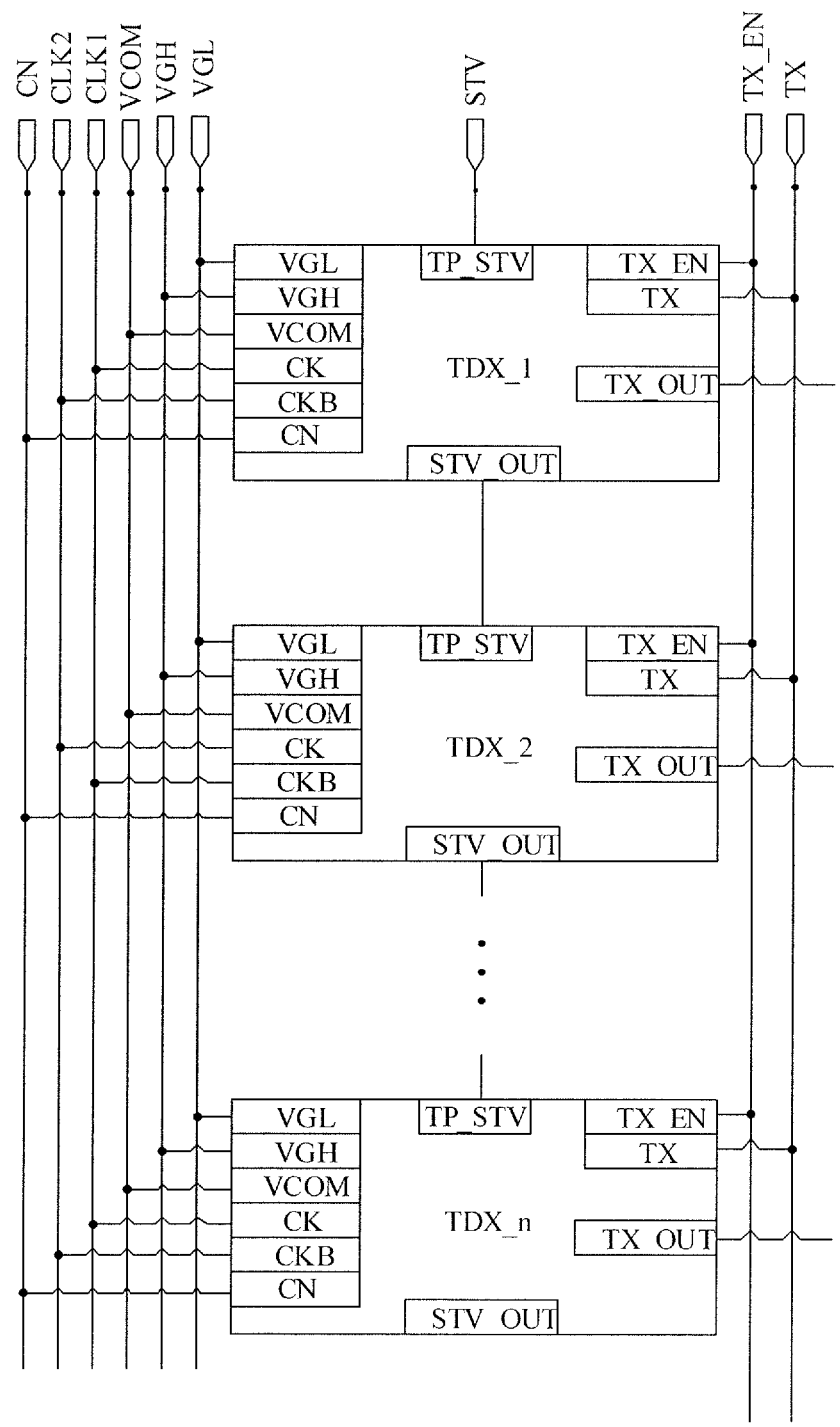
FIG. 8 is a schematic diagram of a touch drive circuit in an embodiment of the present disclosure.

An embodiment of the present disclosure provides a touch drive circuit that is used for a touch device, as illustrated in FIG. 8, the touch drive circuit comprises a plurality of cascaded touch drive units (TXD_1, TX_2 . . . TXD_n) according to any one of the touch drive units in the embodiments of the present disclosure.

The shift signal output terminal STV_OUT of a preceding-level touch drive unit is electrically connected to the shift signal input terminal TP_STV of a following-level touch drive unit, except for the first level touch drive unit TXD_1. For example, the shift signal input terminal TP_STV of the first level touch drive unit TXD_1 can be configured to receive a trigger signal STV.

Further, the first clock signal terminal CK and the second clock signal terminal CKB are alternately connected with the clock signals CLK1 and CLK2 of the system (such as a touch chip or a touch display chip) that comprises the touch drive circuit. For example, the waveforms that are output from the clock signals CLK1 and CLK2 of the system are opposite to each other.

It should be noted that the touch drive circuit possesses the same technical advantages as the touch drive unit of the above embodiments, and here the advantages are not described again.

Figure 6:
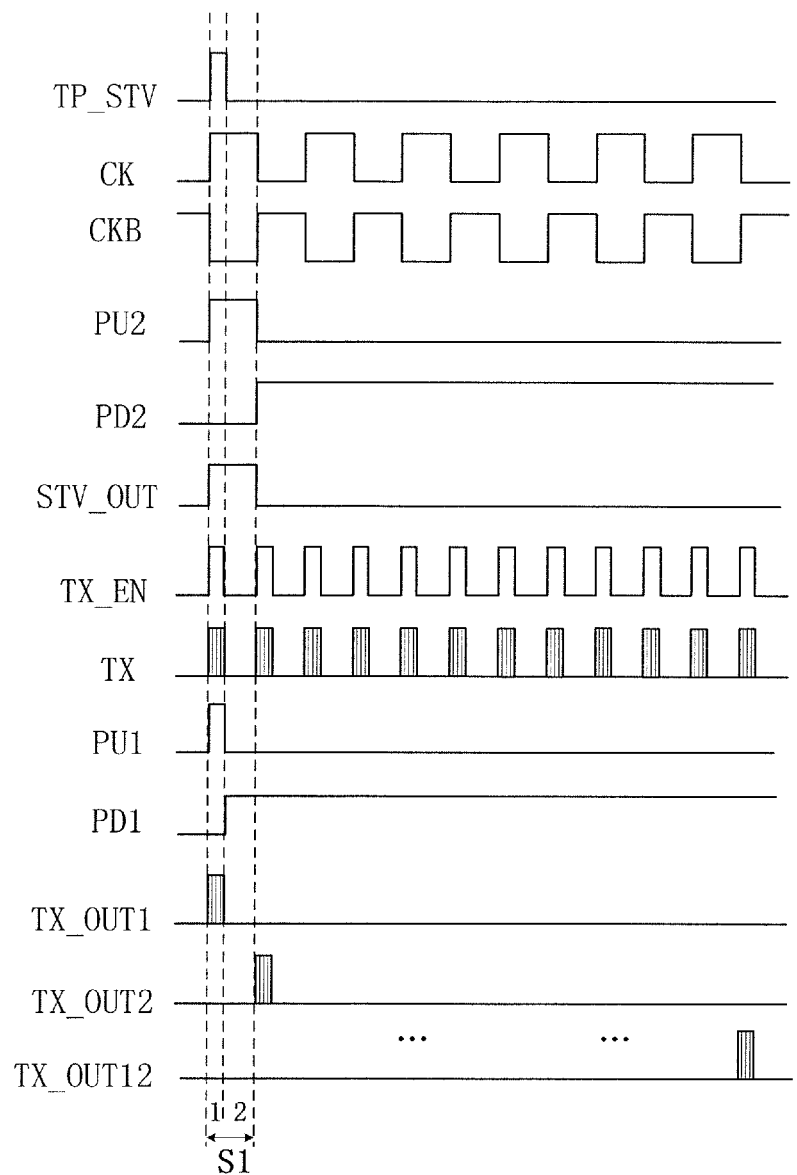
FIG. 6 is a sequence diagram 1 that is used for driving the touch drive unit in FIG. 5.
Figure 7:
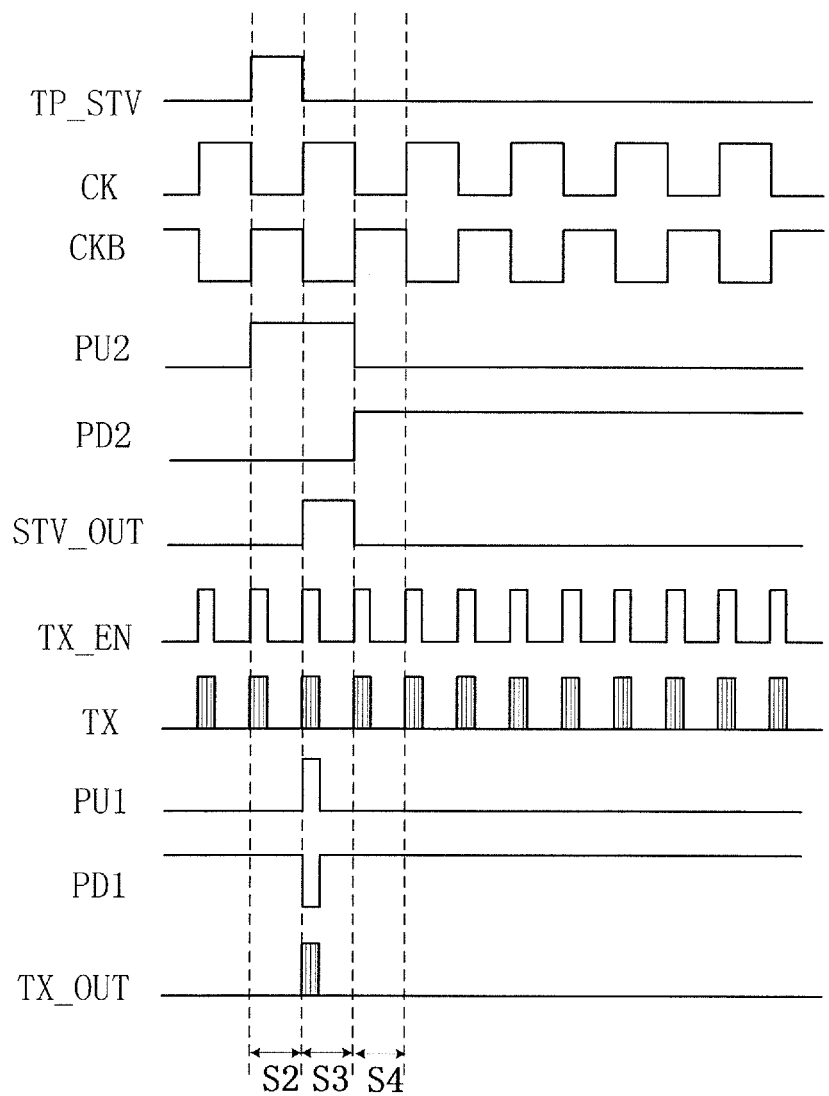
FIG. 7 is a sequence diagram 2 that is used for driving the touch drive unit in FIG. 5.

Taking the transistors being all N-type transistors as an example, and in connection with the sequence diagram that illustrated in FIG. 6 and FIG. 7 to illustrate the driving process of the touch drive unit in different stages in detail. In order to illustrate conveniently, taking the first voltage terminal VGH and the shift control signal terminal CN inputting a high potential, the second voltage terminal VGL and the third voltage terminal VCOM inputting a low potential as an example to illustrate for the embodiment of the present disclosure. Besides, as illustrated in FIG. 6 and FIG. 7, the width of the pulse signal of the touch gate signal terminal TX_EN can comprise the widths of pulse signals of the touch drive signal terminal TX.

It should be noted that FIG. 6 is the sequence diagram of the control signals and the output signals when the touch drive unit that is illustrated in FIG. 5 is used as the first level touch drive unit in the touch drive circuit; FIG. 7 is the sequence diagram of the control signals and the output signals when the touch drive unit that is illustrated in FIG. 5 is used as the touch drive unit in other level than the first level in the touch drive circuit.

The following description is conducted in connection with FIG. 6 and FIG. 5 to illustrate first, when the touch drive unit that is illustrated in FIG. 5 is used as the first level touch drive unit in the touch drive circuit, the working principle of a stage S1, a first stage 1 and a second stage 2 that are illustrated in FIG. 6 are described. For example, as for the first level touch drive unit, its shift signal input terminal TP_STV can be configured to receive the trigger signal STV to trigger the touch drive circuit to work. In FIG. 6, the TX_OUT1 represents the touch signal output terminal of the first level touch drive unit, TX_OUT2 represents the touch signal output terminal of the second level touch drive unit, . . . , and TX_OUT12 represents the touch signal output terminal of the twelfth level touch drive unit.

In the first stage 1 that is illustrated in FIG. 6, TP_STV=1; CK=1; CKB=0; TX_EN=1. Here, "1" represents a high potential, and "0" represents a low potential.

First, the shift control signal terminal CN keeps inputting the high potential, the eighth transistor T8 is switched on, the high potential that is input from the shift signal input terminal TP_STV is transmitted to the gate electrode of the ninth transistor T9, the eleventh transistor T11 and the thirteenth transistor T13 through the eighth transistor T8 to make the ninth transistor T9, the eleventh transistor T11 and the thirteenth transistor T13 be switched on as well. Therefore, the high potential that is input from the first voltage terminal VGH is transmitted to the second pull-up node PU2 through the ninth transistor T9 and the nineteenth transistor T19 to charge the second pull-up node PU2. The second pull-up node PU2 is charged to the high potential, and therefore the tenth transistor T10 is switched on, and outputs the high potential that is input from the first clock signal terminal CK to the shift signal output terminal STV_OUT through the tenth transistor T10.

The high potential of the shift signal output terminal STV_OUT enables the sixteenth transistor T16 to be switched on, and therefore pulls down the electrical potential of the second pull-down node PD2 to the low potential that is input from the second voltage terminal VGL. The second pull-down node PD2 is the low potential, and therefore the eighteenth transistor T18 and the seventeenth transistor T17 are switched off.

At the same time, in the first stage 1, the high potential that is input from the first clock signal terminal CK charges the fourth capacitor C4 through the twelfth transistor T12. For example, when designing the transistors, the twelfth transistor T12 and the thirteenth transistor T13 can be configured (such as the size ratio, threshold voltage and so on of the two transistors are configured) to charge the end of the fourth capacitor C4, namely the electrical potential of the gate electrode of the fourteenth transistor T14, to make the fourteenth transistor T14 switched on when the transistors T12 and T13 both are switched on. The low potential that is input from the second clock signal terminal CKB makes the fifteenth transistor T15 be switched off.

It should be noted that, in the S1 stage that is shown in FIG. 6, as long as the shift signal input terminal TP_STV inputs a high potential pulse signal (such as the trigger signal STV), the electrical potential of the second pull-up node PU2 can be charged to the high potential, and at the same time, when the first clock signal terminal CK inputs the high potential, the shift signal output terminal STV_OUT outputs the high potential that is input from the first clock signal terminal CK as the shift signal, namely the shift signal output terminal STV_OUT is maintained at the high potential in the S1 stage. Besides, for example, the pulse width of the high potential pulse signal that is input from the shift signal input terminal TP_STV can be smaller than that of the signal that is input from the first clock signal terminal CK, and the embodiments of the present disclosure are not limited in this aspect.

Further, it should be noted that the signal that is input from the first clock signal terminal CK and the signal that is input from the second clock signal terminal CKB can be configured to opposite to each other in phase. The following embodiments are the same as the above mentions and not described again.

In the first stage 1 the shift signal output terminal STV_OUT outputs the high potential, and therefore the fourth transistor T4 is switched on. At the same time, the first voltage terminal VGH inputs the high potential, and therefore the fifth transistor T5 is switched on and the high potential that is input from the touch gate signal terminal TX_EN can be transmitted to the first pull-up node PU1 through the fourth transistor T4 and the fifth transistor T5 to charge the first pull-up node PU1. The first pull-up node PU1 is the high potential, and therefore the sixth transistor T6 is switched on and the touch drive signal that is input from the touch drive electrode TX can be transmitted to the touch signal output terminal TX_OUT through the sixth transistor T6. For example, the touch signal output terminal TX_OUT can be connected to the touch drive electrode, and therefore the touch drive signal that is output from the touch signal output terminal TX_OUT can drive the touch drive electrode that is connected with the touch signal output terminal TX_OUT.

Figure 10:
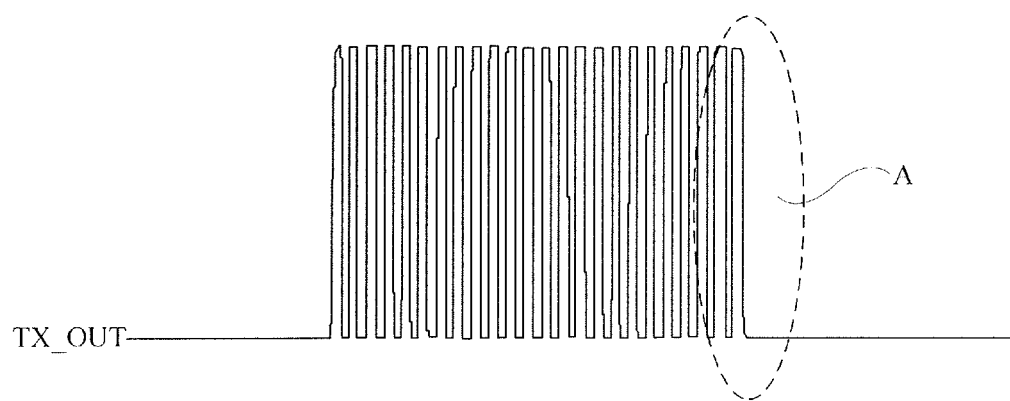
FIG. 10 is a waveform of a touch drive signal that is output from a touch drive unit in an embodiment of the present disclosure.

At the same time, the first voltage terminal VGH inputs the high potential, and therefore the twentieth transistor T20 continues to switch on, and the high potential that is input from the touch gate signal terminal TX_EN can be further transmitted to the gate electrodes of both the first transistor T1 and second transistor T2 through the twentieth transistor T20 to make the first transistor T1 and second transistor T2 switched on. Similarly, the first voltage terminal VGH inputs the high potential, and therefore the third transistor T3 and the twenty-first transistor T21 maintain the ON-state. For example, when designing the transistor, the first transistor T1, the second transistor T2 and the third transistor T3 can be configured (such as the size ratio, threshold voltage and so on of the three transistors are configured) to pull down the electrical potential of the gate electrode of the seventh transistor T7, namely the electrical potential of the first pull-down node PD1, to the low potential that is input from the second voltage terminal VGL because of the voltage division of the first transistor T1 and the second transistor T2 when the first transistor T1, the second transistor T2 and the third transistor T3 all are switched on. This configuration can prevent the touch drive signal that is output from the touch signal output terminal TX_OUT from being interfered by the noise incurred by the signal that is input from the third voltage terminal VCOM due to the wrongly switched-on seventh transistor T7. For example, in an example, as illustrated in FIG. 10, the touch drive signal that is output from the touch signal output terminal TX_OUT at the position A of the waveform is obviously reduced compared with that in FIG. 1.

It is known from the above mentioned, the first transistor T1 and the second transistor T2 that are in series constitute an inverter.

In summary, in the first stage 1 of the stage S1, the touch signal output terminal TX_OUT outputs the touch drive signal to the touch drive electrode connected with it, and under the action of the shift register sub-unit 01, the touch signal output terminals of the cascaded touch drive units, such as TX_OUT1, TX_OUT2, ..., TX_OUT12 and so on, output the touch drive signals line by line.

Next, in the second stage 2 that is illustrated in FIG. 6, TP_STV=0; CK=1; CKB=0; TX_EN=0.

In the stage 2, the shift control signal terminal CN keeps inputting the high potential, the eighth transistor T8 switches on, the low potential that is input from the shift signal input terminal TP_STV is transmitted to the gate electrodes of the ninth transistor T9, the eleventh transistor T11 and the thirteenth transistor T13 through the eighth transistor T8 so as to make the ninth transistor T9, and the eleventh transistor T11 and the thirteenth transistor T13 switched off.

The third capacitor C3 applies the high potential that is stored in the first stage 1 to the gate electrode of the tenth transistor T10, keeping the tenth transistor T10 switched on. In the second stage 2, the first clock signal terminal CK is maintained at the high potential, and therefore the touch signal output terminal TX_OUT continues to output the shift signal of the high potential.

The shift signal output terminal STV_OUT outputs the high potential, and therefore the fourth transistor T4 switches on. At the same time, the touch gate signal terminal TX_EN is at the low potential at this stage, and therefore the first pull-up node PU1 can discharge through the fifth transistor T5 and the fourth transistor T4 and pull down the electrical potential of the first pull-up node PU1, and make the sixth transistor T6 be switched off.

In addition, when the touch drive unit comprises the reset circuit 61 that is illustrated in FIG. 5, in this stage, the reset signal (such as the high potential) that is input from the reset terminal RST can be switched on the twenty-second transistor T22, and therefore the first pull-up node PU1 can be electrically connected with the second voltage terminal VGL, further pulling down the electrical potential of the first pull-up node PU1. The reset circuit 61 can be used to better reduce the noise of the first pull-up node PU1 and increase the signal transmission quality of the circuit.

The low potential that is input from the touch gate signal terminal TX_EN can be transmitted to the gate electrodes of the first transistor T1 and second transistor T2 through the twentieth transistor T20 to switch off the first transistor T1 and second transistor T2. At the same time, the high potential that is input from the first voltage terminal VGH can be transmitted to the first pull-down node PD1 through the third transistor T3 and the twenty-first transistor T21 to charge the first pull-down node PD1. The first pull-down node PD1 is charged to the high potential, and therefore the seventh transistor T7 is switched on, and the electrical potential of the touch signal output terminal TX_OUT is pulled down to the third voltage (such as the low potential) that is input from the third voltage terminal VCOM to reset the touch signal output terminal TX_OUT.

As for the touch drive unit at the first level, the touch signal output terminal TX_OUT1 is pulled down to the third voltage terminal VCOM all the time until the signals that are input from the shift control signal terminal CN and the shift signal input terminal TP_STV change to the high potential again.

The following is described in connection with FIG. 7 and FIG. 5 to illustrate, when the touch drive unit that is illustrated in FIG. 5 is used as the touch drive unit in other level than the first level in the touch drive circuit, the working principle of the stage S2, the stage S3 and the stage S4 that are illustrated in FIG. 7 will be described.

It should be noted that when FIG. 6 is the sequence diagram of the first level touch drive unit and FIG. 7 is the sequence diagram of the second level touch drive unit, the stage S2 that is illustrated in FIG. 7 and the stage S1 that is illustrated in FIG. 6 is the same stage in sequence. It is known from the connection that is illustrated in FIG. 8 that in the stage S1, the shift signal that is output from the shift signal output terminal STV_OUT of the first level touch drive unit is input to the shift signal input terminal TP_STV of the second level touch drive unit. Further, the waveforms of signals that are input from the first clock signal terminal of the first level touch drive unit and the first clock signal terminal of the second level touch drive unit are opposite to each other in phrase.

The stage S2 that is illustrated in FIG. 7, TP_STV=1; CK=0; CKB=1.

The shift control signal terminal CN keeps inputting the high potential, the eighth transistor T8 is switched on, the high potential that is input from the shift signal input terminal TP_STV is transmitted to the gate electrodes of the ninth transistor T9, the eleventh transistor T11 and the thirteenth transistor T13 through the eighth transistor T8 to make the ninth transistor T9, the eleventh transistor T11 and the thirteenth transistor T13 are switched on. Therefore, the high potential that is input from the first voltage terminal VGH is transmitted to the second pull-up node PU2 through the ninth transistor T9 and the nineteenth transistor T19 to charge the second pull-up node PU2. The second pull-up node PU2 is charged to the high potential, and therefore the tenth transistor T10 is switched on, and the low potential that is input from the first clock signal terminal CK is output to the shift signal output terminal STV_OUT through the tenth transistor T10.

At the same time, in the stage S2, the low potential that is input from the first clock signal terminal CK switches off the twelfth transistor T12. Because thirteenth transistor T13 is switched on, the fourth capacitor C4 can discharge through the thirteenth transistor T13 and switch off the fourteenth transistor T14. Because the eleventh transistor T11 switches on, the fifth capacitor C5 can discharge through the eleventh transistor T11 and make the electrical potential of the second pull-down node PD2 be the low potential.

In the stage S2, the shift signal output terminal STV_OUT outputs the low potential, and therefore the touch signal output terminal TX_OUT of the gate sub-unit does not output the touch drive signal in this stage.

Next, in the stage S3 that is illustrated in FIG. 7, TP_STV=0; CK=1; CKB=0.

In the stage S3, the third capacitor C3 applies the high potential that is stored in stage S2 to the gate electrode of the tenth transistor T10, making the tenth transistor T10 keep switching on. At the same time, the first clock signal terminal CK inputs the high potential, and therefore the shift signal output terminal STV_OUT outputs the signal that is input from the first clock signal terminal CK as the shift signal to the shift signal output terminal STV_OUT.

The high potential that is output from the shift signal output terminal STV_OUT is transmitted to the gate sub-unit, and when the touch gate signal terminal TX_EN inputs the high potential, the touch drive signal that is input from the touch drive electrode TX can be transmitted to the touch signal output terminal TX_OUT through the sixth transistor T6. The detailed description of this stage can refer to the corresponding description of the stage S1 that is illustrated in FIG. 6, and therefore is not repeated here.

Further, in the stage S3, the twelfth transistor T12 switches on and the thirteenth transistor T13 is switched off; and therefore the high potential that is input from the first clock signal terminal CK can charge the fourth capacitor C4.

Next, in the stage S4 that is illustrated in FIG. 7, TP_STV=0; CK=0; CKB=1.

In the stage S4, the fourth capacitor C4 applies the high potential that is stored in stage S3 to the gate electrode of the fourteenth transistor T14, making the fourteenth transistor T14 switched on. At the same time, the second clock signal terminal CKB inputs the high potential, and therefore the fifteenth transistor T15 switches on, and the high potential that is input from the second clock signal terminal CKB can charge the second pull-down node PD2 through the fourteenth transistor T14 and the fifteenth transistor T15.

Because the second pull-down node PD2 is charged to the high potential, making the seventeenth transistor T17 and eighteenth transistor T18 switch on, the second pull-up node PU2 and the shift signal output terminal STV_OUT are reset.

The shift signal output terminal STV_OUT outputs the low potential in this stage, and therefore the gate sub-unit does not output the touch drive signal.

It should be noted that, although the sequence diagram in FIG. 8 takes the second level touch drive unit as an example to illustrate, the related driving method can apply to all the touch drive units in other levels than the first level, and the embodiments of the present disclosure are not limited in this aspect.

An embodiment of the present disclosure provides a touch device, and the touch device comprises the touch drive unit that is mentioned above. The touch device has the same technical advantages as any of the touch drive circuits provided by the above embodiments, and these advantages are not described here again. In at least one embodiment, the touch device is a touch display device, for example, the touch display device can be in an on-cell structure, an in-cell structure and so on.

Figure 9:
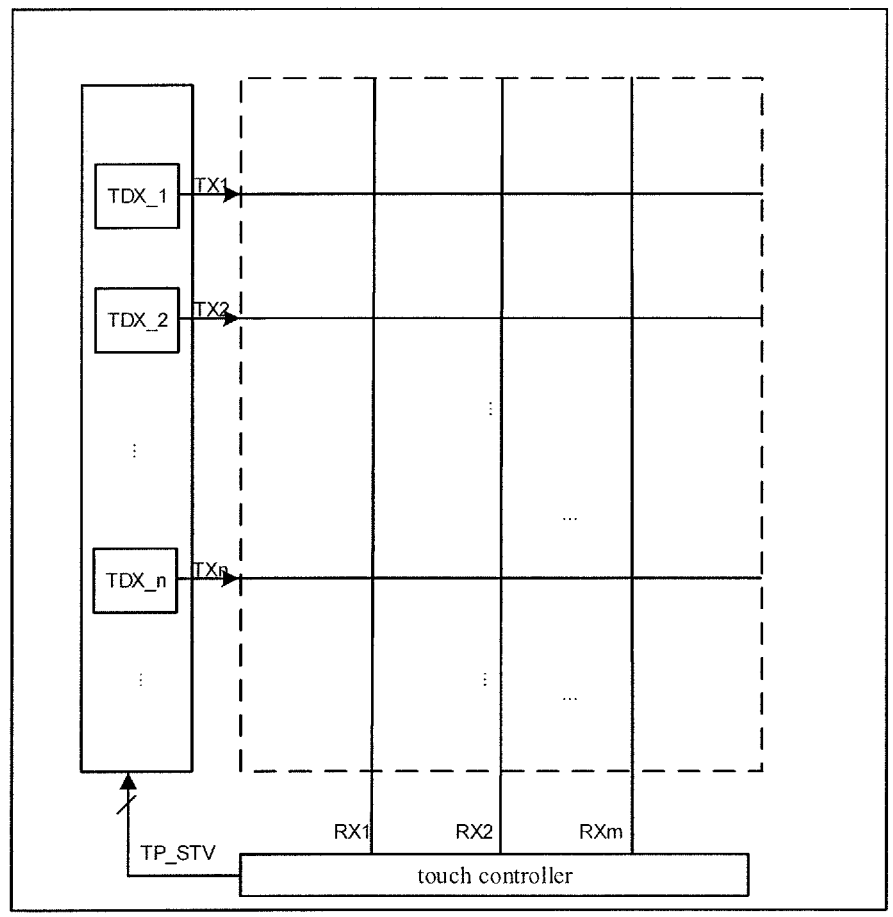
FIG. 9 is a schematic diagram of a touch device in an embodiment of the present disclosure.

A touch device according to the embodiment of the present disclosure is illustrated in FIG. 9, for example, the touch device can be a mutual capacitive touch device, the touch area (the part indicated by the dashed line frame in the diagram) of the mutual capacitive touch device comprises touch drive electrodes TX and touch sense electrodes RX that intersected with each other. Each touch drive electrode TX is connected to the touch drive circuit according to any one of the embodiments in the present disclosure; each touch sense electrode RX is connected to the touch controller; the touch controller can also provide various control signals to the touch drive circuit, for example, the clock signals CK and CKB, the trigger signal TP_STV, and so on. The touch drive circuit inputs touch drive signals to the touch drive electrodes TX line by line, so that sense signals are generated by the touch sense electrodes RX, and the touch controller receives the touch sense signals. When a touch activity by the human body or the touch pen occurs, the capacitance between the touch drive electrode TX and the touch sense electrode RX changes at the touch point, the sense signal in the sense electrode RX also changes, and the touch position can be obtained by analyzing the coordinates of the changed sense signal that is output.

It should be noted that the above exemplary touch display device can comprise a liquid crystal touch display device, an organic light emitting diode touch display device, an electronic paper display device, and so on, for example, the touch display device can be a product or a component, such as a liquid crystal touch display, a liquid crystal touch television, a touch phone, a touch plane panel computer and so on that comprise the function of touch display.

An embodiment of the present disclosure provides a driving method applicable to any one of the above described touch drive unit, and the method comprises the following operations.

In a first stage, under a control of a shift signal, a signal that is input from the touch gate signal terminal TX_EN is transmitted to the first pull-up node PU1 through the first input circuit 11 to charge the first pull-up node PU1; under a control of an electrical potential of the first pull-up node PU1, the first pull-up circuit 31 transmits the touch drive signal to the touch signal output terminal TX_OUT; the first pull-down control circuit 41 outputs the second voltage to the first pull-down node PD1 to pull down the first pull-down node PD1.

In a second stage, under the control of the shift signal, the first pull-up node PU1 discharges through the first input circuit 11 to pull down the first pull-up node PU1; the first pull-down control circuit 41 outputs the first voltage to the first pull-down node PD1 to charge the first pull-down node PD1; under a control of an electrical potential of the first pull-down node PD1, a voltage of the touch signal output terminal TX_OUT is pulled down to the third voltage to reset the touch signal output terminal TX_OUT.

The detailed description of the driving method in the embodiment can refer to the corresponding description about the driving process of FIG. 6 and therefore is not repeated here.

Those skilled in the art can understand: all or part of the steps of the method embodiment can be accomplished by a program in connection with the related hardware, the program can be stored in a computer readable storage medium, when the program is run on the hardware, the steps of the method embodiment are all performed; and the storage medium can be various kinds of medium that can store the computer executable program codes, comprising ROM, RAM, magnetic disk, compact disk, and so on.

What are described above is related to the illustrative embodiments of the disclosure only and not limitative to the scope of the disclosure; the scopes of the disclosure are defined by the accompanying claims.

What is claimed is:

1. A touch drive unit, comprising a shift register sub-unit, a gate sub-unit; wherein
the shift register sub-unit comprises a shift signal output terminal and is configured to output a shift signal to the gate sub-unit by the shift signal output terminal;
the gate sub-unit comprises a first input circuit, a first pull-up circuit, a first pull-down control circuit, and a first pull-down circuit;
the first input circuit is electrically connected to the shift signal output terminal, a touch gate signal terminal, a first pull-up node and the first pull-down control circuit, and is configured to output a signal that is input from the touch gate signal terminal to the first pull-up node and the first pull-down control circuit under a control of the shift signal;
the first pull-up circuit is electrically connected to a touch drive signal terminal, the first pull-up node and a touch signal output terminal, and is configured to output a touch drive signal that is input from the touch drive signal terminal to the touch signal output terminal under a control of an electrical potential of the first pull-up node;
the first pull-down control circuit is further electrically connected to a first pull-down node, the first voltage terminal and a second voltage terminal, and is configured, under a control of the first input circuit and a first voltage that is input from the first voltage terminal, to output the first voltage and a second voltage that is input from the second voltage terminal to the first pull-down node; and
the first pull-down circuit is electrically connected to the first pull-down node, a third voltage terminal and the touch signal output terminal, and is configured to pull down a voltage of the touch signal output terminal to a third voltage that is input from the third voltage terminal under a control of an electrical potential of the first pull-down node;
wherein the shift register sub-unit further comprises a second input circuit, a second pull-up control circuit, a second pull-down control circuit, a second pull-up circuit and a second pull-down circuit;
the second input circuit is electrically connected to the second pull-up control circuit, the second pull-down control circuit, a shift control signal terminal and a shift signal input terminal, and is configured to output a signal that is input from the shift signal input terminal to the second pull-up control circuit and the second pull-down control circuit under a control of the shift control signal terminal;
the second pull-up circuit is further electrically connected to a second pull-up node, the first voltage terminal, the second pull-down circuit and the second pull-down control circuit, and is configured to output the first voltage to the second pull-up node under a control of the second input circuit;
the second pull-down control circuit is further electrically connected to a second pull-down node, a first clock signal terminal, a second clock signal terminal, the second voltage terminal and the shift signal output terminal, and is configured, under a control of the second input circuit, a first clock signal that is input from the first clock signal terminal and a second clock signal that is input from the second clock terminal, to output the second clock signal to the second pull-down node, or under a control of the shift signal output terminal, to pull down a voltage of the second pull-down node to the second voltage;
the second pull-up circuit is electrically connected to the second pull-up node, the first clock signal terminal and the shift signal output terminal, and is configured to output the first clock signal as the shift signal to shift signal output terminal under a control of an electrical potential of the second pull-up node; and
the second pull-down circuit is electrically connected to the second pull-up control circuit, the second pull-down node, the shift signal output terminal and the second voltage terminal, and is configured to respectively pull down the electrical potential of the second pull-up node and the voltage of the shift signal output terminal to the second voltage under a control of the second pull-down node.

2. The touch drive unit according to claim 1, wherein the gate sub-unit comprises a first pull-up control circuit;

the first pull-up control circuit is electrically connected to the first voltage terminal, the first input circuit and the first pull-up node, and is configured to transmit a signal that is output from the first input circuit to the first pull-up node under a control of the first voltage.

3. The touch drive unit according to claim 2, wherein the first pull-up control circuit comprises a fifth transistor, a gate electrode of the fifth transistor is electrically connected to the first voltage terminal, a first electrode of the fifth transistor is electrically connected to the first input circuit, and a second electrode of the fifth transistor is electrically connected to the first pull-up node.

4. The touch drive unit according to claim 1, wherein, the first pull-down control circuit comprises a first transistor, a second transistor, a third transistor and a first capacitor;

a gate electrode of the first transistor is electrically connected to the first input circuit, a first electrode of the first transistor is electrically connected to a second electrode of the second transistor, and a second electrode of the first transistor is electrically connected to the second voltage terminal;

a gate electrode of the second transistor is electrically connected to the first input circuit, and a first electrode of the second transistor is electrically connected to the first pull-down node;

a gate electrode and a first electrode of the third transistor are electrically connected to the first voltage terminal, and a second electrode of the third transistor is electrically connected to the first pull-down node; and an end of the first capacitor is electrically connected to the first pull-down node, and other end of the first capacitor is electrically connected to the second voltage terminal.

5. The touch drive unit according to claim 4, wherein the first pull-down control circuit comprises a twentieth transistor and a twenty-first transistor;

a gate electrode of the twentieth transistor is electrically connected to the first voltage terminal, a first electrode of the twentieth transistor is electrically connected to the first input circuit, and a second electrode of the twentieth transistor is electrically connected to the gate electrode of the second transistor; and a gate electrode of the twenty-first transistor is electrically connected to the first voltage terminal, a first electrode of the twenty-first transistor is electrically connected to the first electrode of the second transistor, and a second electrode of the twenty-first transistor is electrically connected to the first pull-down node.

6. The touch drive unit according to claim 1, wherein the first input circuit comprises a fourth transistor, a gate electrode of the fourth transistor is electrically connected to the shift signal output terminal, a first electrode of the fourth transistor is electrically connected to the touch gate signal terminal, and a second electrode of the fourth transistor is electrically connected to the first pull-up node.

7. The touch drive unit according to claim 1, wherein the first pull-up circuit comprises a sixth transistor and a second capacitor;

a gate electrode of the sixth transistor is electrically connected to the first pull-up node, a first electrode of the sixth transistor is electrically connected to the touch drive signal terminal, and a second electrode of the sixth transistor is electrically connected to the touch signal output terminal; and an end of the second capacitor is electrically connected to the gate electrode of the sixth transistor, and other end of the second capacitor is electrically connected to the second electrode of the sixth transistor.

8. The touch drive unit according to claim 1, wherein the first pull-down circuit comprises a seventh transistor, a gate electrode of the seventh transistor is electrically connected to the first pull-down node, a first electrode of the seventh transistor is electrically connected to the touch signal output terminal, and a second electrode of the seventh transistor is electrically connected to the third voltage terminal.

9. The touch drive unit according to claim 1, wherein the second input circuit comprises an eighth transistor, a gate electrode of the eighth transistor is electrically connected to the shift control signal terminal, a first electrode of the eighth transistor is electrically connected to the shift signal input terminal, and a second electrode of the eighth transistor is electrically connected to the first pull-up control circuit and the first pull-down control circuit.

10. The touch drive unit according to claim 1, wherein the second pull-up control circuit comprises an ninth transistor, a gate electrode of the ninth transistor is electrically connected to the second input circuit, a first electrode of the ninth transistor is electrically connected to the first voltage terminal, and a second electrode of the ninth transistor is electrically connected to the second pull-down circuit.

11. The touch drive unit according to claim 10, wherein the second pull-up control circuit further comprises an nineteenth transistor, a gate electrode of the nineteenth transistor is electrically connected to the first voltage terminal, a first electrode of the nineteenth transistor is electrically connected to the second electrode of the ninth transistor, and a second electrode of the nineteenth transistor is electrically connected to the second pull-up node.

12. The touch drive unit according to claim 1, wherein the second pull-up circuit comprises a tenth transistor and a third capacitor;

a gate electrode of the tenth transistor is electrically connected to the second pull-up node, a first electrode of the tenth transistor is electrically connected to the first clock signal terminal, and a second electrode of the tenth transistor is electrically connected to the shift signal output terminal; and an end of the third capacitor is electrically connected to the gate electrode of the tenth transistor, and other end of the third capacitor is electrically connected to the second electrode of the tenth transistor.

13. The touch drive unit according to claim 1, wherein the second pull-down circuit comprises an eleventh transistor, a twelfth transistor, a thirteenth transistor, a fourteenth transistor, a fifteenth transistor, a sixteenth transistor and a fourth capacitor;

a gate electrode of the eleventh transistor is electrically connected to the second input circuit, a first electrode of the eleventh transistor is electrically connected to the second pull-down node, and a second electrode of the eleventh transistor is electrically connected to the second voltage terminal;

a gate electrode and a first electrode of the twelfth transistor are electrically connected to the first clock signal terminal, and a second electrode of the twelfth transistor is electrically connected to a gate electrode of the fourteenth transistor;

a gate electrode of the thirteenth transistor is electrically connected to the second input circuit, a first electrode of the thirteenth transistor is electrically connected to the gate electrode of the fourteenth transistor, and a second electrode of the thirteenth transistor is electrically connected to the second voltage terminal;

a first electrode of the fourteenth transistor is electrically connected to the second clock signal terminal, and a second electrode of the fourteenth transistor is electrically connected to a first electrode of the fifteenth transistor;

a gate electrode of the fifteenth transistor is electrically connected to the second clock signal terminal, and a second electrode of the fifteenth transistor is electrically connected to the second pull-down node;

a gate electrode of the sixteenth transistor is electrically connected to the shift signal output terminal, a first electrode of the sixteenth transistor is electrically connected to the second pull-down node, and a second electrode is electrically connected to the second voltage terminal; and an end of the fourth capacitor is electrically connected to the gate electrode of the fourteenth transistor, and other end of the fourth capacitor is electrically connected to the second voltage terminal.

14. The touch drive unit according to claim 1, wherein the second pull-down circuit comprises a seventeenth transistor, a eighteenth transistor and a fifth capacitor;

a gate electrode of the seventeenth transistor is electrically connected to the second pull-down node, a first electrode of the seventeenth transistor is electrically connected to the second pull-up control circuit, and a second electrode of the seventeenth transistor is electrically connected to the second voltage terminal;

a gate electrode of the eighteenth transistor is electrically connected to the second pull-down node, a first electrode of the eighteenth transistor is electrically connected to the shift signal output terminal, and a second electrode of the eighteenth transistor is electrically connected to the second voltage terminal; and an end of the fifth capacitor is electrically connected to the second pull-down node, and other end of the fifth capacitor is electrically connected to the second voltage terminal.

15. The touch drive unit according to claim 1, wherein the gate sub-unit further comprises a reset circuit;

the reset circuit is electrically connected to a reset terminal, the first pull-up node and the second voltage terminal, and is configured to output the second voltage to the first pull-up node under a control of a reset signal that is input from the reset terminal.

16. The touch drive unit according to claim 15, wherein the reset circuit comprises a twenty-second transistor, a gate electrode of the twenty-second transistor is electrically connected to the reset terminal, a first electrode of the twenty-second transistor is electrically connected to the first pull-up node, and a second electrode is electrically connected to the second voltage terminal.

17. A touch drive circuit, comprising a plurality of cascaded touch drive units according to claim 1, wherein, except for a first level touch drive unit, a shift signal output terminal of a preceding-level touch drive unit is electrically connected to a shift signal input terminal of a following-level touch drive unit.

18. A touch device, comprising the touch drive circuit according to claim 17.

19. A driving method of the touch drive unit according to claim 1, comprising:

a first stage in which under the control of the shift signal, the signal that is input from the touch gate signal terminal is transmitted to the first pull-up node through the first input circuit to charge the first pull-up node; under the control of an electrical potential of the first pull-up node, the first pull-up circuit transmits the touch drive signal to the touch signal output terminal; the first pull-down control circuit outputs the second voltage to the first pull-down node to pull down the first pull-down node; and a second stage in which under the control of the shift signal, the first pull-up node discharges through the first input circuit to pull down the first pull-up node; the first pull-down control circuit outputs the first voltage to the first pull-down node to charge the first pull-down node; and under the control of the electrical potential of the first pull-down node, the voltage of the touch signal output terminal is pulled down to the third voltage to reset the touch signal output terminal.

* * * * *